United States Patent

[11] 3,613,991

[72] Inventors John S. Quinn;
Walter G. Murch, both of Dayton, Ohio
[21] Appl. No. 805,553
[22] Filed Mar. 10, 1969
[45] Patented Oct. 19, 1971
[73] Assignee The United States of America as represented by the Secretary of the Air Force

[54] BACKLOBE-JAMMING BURNTHROUGH RANGE CALCULATOR
1 Claim, 1 Drawing Fig.
[52] U.S. Cl. .................................................. 235/85 R, 235/89 R
[51] Int. Cl. .................................................. G06c 3/00
[50] Field of Search .......................................... 235/85, 89, 61 B, 61 S

[56] References Cited
UNITED STATES PATENTS
| | | | |
|---|---|---|---|
| 1,383,492 | 7/1921 | Seely .......................... | 235/89 |
| 2,219,429 | 4/1940 | Osterberg .................... | 235/61 B |
| 2,546,641 | 3/1951 | Llanso ........................ | 235/85 X |

Primary Examiner—Richard B. Wilkinson
Assistant Examiner—John F. Gonzales
Attorneys—Harry A. Herbert, Jr. and Jacob N. Erlich ABSTRACT: A calculator having a flat surface having two vertical scales thereon and a slideable rule having two horizontal scales thereon. The rule is capable of slideable motion in a direction parallel to the vertical scales. The flat surface further has a plurality of equally spaced parallel lines with a positive slope of four. By entering known values for three of the scales, the fourth scale determines the range at which radar can detect a target when the radar is being jammed in the backlobes by multiple standoff jamming platforms.

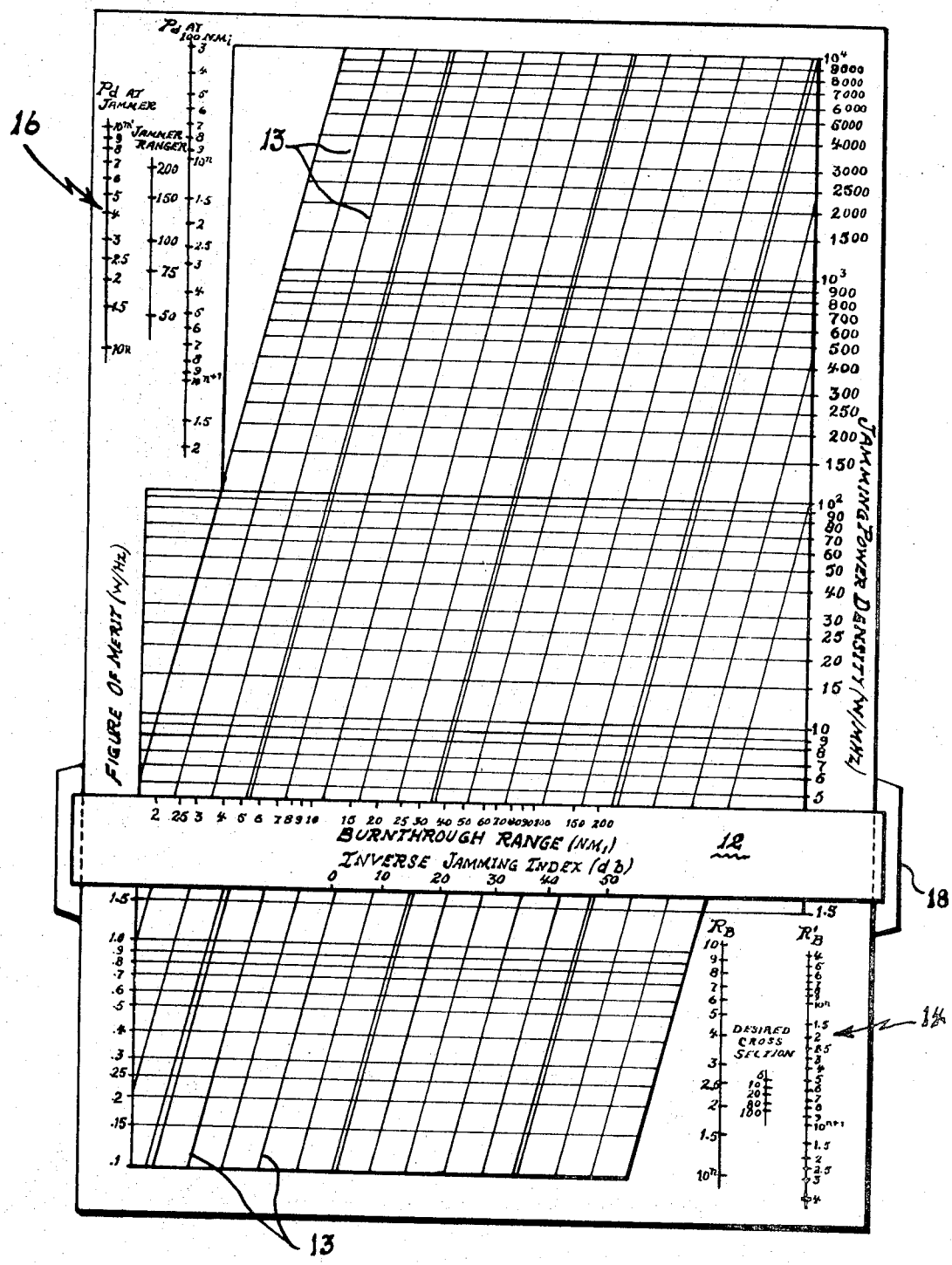

BACKLOBE-JAMMING BURNTHROUGH RANGE CALCULATOR

BACKGROUND OF THE INVENTION

This invention relates generally to calculators, and more particularly to a calculator which determines the range at which a radar can detect a target when the radar is being jammed in the backlobes by multiple standoff jamming platforms.

Basically all pulse radar systems operate on the principle of emitting a short R.F. signal (usually referred to as a pulse) and measuring the time elapsing between the emission of this signal and the reception of an echo from a target.

Since the velocity of radio waves is known, the information so obtained enables the range of the target to be calculated. The calculation is performed automatically and the final result, in miles or yards, is shown on a Display Unit in a form most convenient for the particular purpose in view.

Direction finding is achieved, at least in the case of the longer wavelength equipments, by methods bearing considerable resemblance to conventional radio direction finding. On the shorter wavelengths the principle is even simpler, amounting fundamentally to little more than determining the direction in which a radar beam must be pointed in order to hit a target and so produce an echo.

Radar was intensively developed under the threat of war, its first purpose being to serve as a means of warning of the approach of hostile aircraft. As techniques developed and increasing accuracy became attainable, development tended to diverge along two separate lines. One was the continued development of warning radar, the other being directed towards the attainment of higher accuracies, although at shorter ranges, with a view to obtaining data of sufficient accuracy for laying and ranging anti-aircraft guns against unseen hostile aircraft.

In order to combat the effectiveness of radar, various types of jamming equipment were devised. These jammers, mainly of the electronic type made it difficult for radar installations to determine the range at which the radar could detect the target or strike aircraft.

Knowledge of the effectiveness of multiple standoff jammers in limiting the burnthrough range (the range at which radar can detect a target) of a strike aircraft is required wherever electronic counter measure mission planning or analysis is done. Furthermore, it is also required by operational and research and development organizations in determining the requirements of new systems. Heretofore, it was extremely complex and tedious to determine the above-mentioned burnthrough ranges.

SUMMARY OF THE INVENTION

The calculator of this invention provides a simple, accurate and direct means for calculating the effectiveness of multiple jammers in screening a given target against a given radar. The calculator of the instant invention presents, in graphic form, a method for determining the burnthrough range (the range at which a radar can detect a target) when the radar is being jammed in the backlobes by multiple standoff jamming platforms. The parameters which must be known for utilization of the calculator are the jammer ranges in nautical miles, the jamming power density in watts/megahertz, the ratio of the radar antenna gain in the direction of the jamming platform to the main gain (hereinafter referred to as the "jamming index"), and the "figure of merit" of the radar.

The jamming power density is entered on the ordinate of the calculator of this invention after which one proceeds on the abscissa to the applicable inverse jamming index value located on a horizontal rule which slides vertically. One then follows the slope of the line selected to the intersection of that line and the appropriate figure of merit of the radar. The burnthrough range is then read directly off the burnthrough scale also located on the horizontal rule.

It is therefore an object of this invention to provide a backlobe-jamming burnthrough range calculator which is a simple, accurate and direct means of determining the effectiveness of multiple jammers in screening a given target against a given radar.

It is another object of this invention to provide a backlobe-jamming burnthrough range calculator which utilizes conventional, currently available components that lend themselves to standard mass producing manufacturing techniques.

For a better understanding of the present invention, together with other and further objects thereof, reference is made to the following description taken in connection with the accompanying drawing and its scope will be pointed out in the appended claims.

DESCRIPTION OF THE DRAWING

The only FIGURE of the drawing represents the backlobe-jamming burnthrough range calculator of this invention in a reduced scale.

DESCRIPTION OF THE PREFERRED EMBODIMENT

As shown in the FIGURE of the drawing, the calculator 10 of this invention is basically a graph with two vertical scales, (jamming power density and figure of merit), and two horizontal scales (jamming index, and burnthrough range). The horizontal scales are laid out on a rule 12 which slides vertically for easy reading.

The face of the calculator 10 contains a number of equally spaced parallel lines 13 with a positive slope of 4. All calculations assume a target with a 10 square meter radar cross section, and all jammers at a nominal range of 100 miles. To provide for other targets, and jammers at other ranges, two aids are sketched on the face of the calculator. In the lower right hand corner a conversion graph 14 is provided to modify the burnthrough range for targets larger or smaller than 10 square meters. In the upper left hand corner a jammer range nomograph 16 is provided to determine equivalent jamming power densities for jammers at other than 100 miles.

The procedure for using the calculator requires that a total jamming power density for all jammers be determined. The calculator is then entered with this value on the vertical Jamming Power Density scale, and the applicable value on the horizontal inverse jamming index scale is selected. The intersection of these two scales determines which of the lines on the face of the calculator defines the existing relationship between the radar figure of merit and the burnthrough range. One follows the slope of the line selected to the intersection of that line and the appropriate figure of merit. At that point the burnthrough range is read. This burnthrough range can then be corrected for a target of other than 10 sq. meters using the cross section conversion nomograph 14 if necessary.

The design of the calculator is based on the equation:

(1) $R_T = [R_j^2 \sigma F / P_D I]^{1/4}$ where $R_T$ is the burnthrough range of the target in meters $R_j$ is the radar to jammer range in meters $\sigma$ is the effective reflective area of the target in sq. meters $P_D$ is the effective jamming power density in the watts per megahertz (2) $I = G_j G_m / G_T^2$ is the jamming index $G_j$ is gain of the radar in the direction of the jammer $G_m$ is maximum radar gain $G_T$ is gain of radar in direction of the target aircraft (3) $F = P_t G_m / 4\pi B_r (J/S)_r$ and called the "radar figure of merit" and has the units of watts/megahertz $P_t$ is peak power of the radar in watts $B_r$ is the radar IF bandwidth in megahertz $(J/S)_r$ is the ratio of the jamming power to radar receiver required to deny target acquisition to the radar.

The calculator assumes a nominal $R_j=100$ mi., and $\sigma=10$ square meters. A nomograph 16 is provided on the upper left hand face of the calculator to obtain a 100 nmi equivalent $P_D$ for jammers at ranges other than 100 nmi, and a nomograph 14 is provided in the lower right hand corner to correct $R_T$ for targets of other than 10 square meter cross section.

"Both scales on the ordinate are logarithmic, as is the burnthrough range scale which is laid out on the abscissa." The inverse jamming index ($1/I$) is given in db. and hence the scale is linear. This scale is positioned so that $1/I=25$ db. is approximately centered on the face of the calculator. The location of the $R_T$ (burnthrough range) scale can then be fixed by assuming specific values for $F$(radar figure of merit), $P_D$(effective jamming power density) and $I$(jamming index), and manually solving equation (1) for $R_T$(burnthrough range of the target). On the face of the calculator 10 shown in the drawing a number of parallel lines with a slope of 4 are drawn. These lines define the relationship between $F$ and $R_T$ when $P_D$ and $I$ are known. The specific applicable line is determined by the appropriate values of $P_D$ and $I$.

The range conversion nomograph 16 in the upper left corner is constructed using the relation:

(4) $P_A/P_B = R^2_A/R^2_B$ or $P_B = P_A R^2_B/R^2_A$ where, $P_A$ is the power density at some distance $R_A$, and $P_B$ is the equivalent power at a nominal distance (100 NMi). The cross section conversion nomograph 14 in the lower right corner is constructed using the relation (5) $R'_B = R_B \sigma'/\sigma n)^{1/4}$ where $\sigma_n$ is 10 sq. meter and $\sigma'$ is the actual cross section. $R_B$ is the calculated burnthrough range and $R_B$ is the burnthrough range corrected for the actual radar cross section of target aircraft.

MODE OF OPERATION

The calculating procedure is to enter the calculator 10 with a known jamming power density $P_D$ on the ordinate, and proceed on the abscissa to the applicable inverse jamming index value ($1/I$). One then proceeds parallel to the sketched lines on the calculators's face to the figure of merit of the victim radar ($F$). The burnthrough range can then be read directly off the burnthrough scale.

Both scales on the abscissa ($1/I$ and $R_t$) have been placed on a movable rule 12 which is free to be moved up and down parallel to the ordinate. The movable rule 12 has extensions 18 thereon for the purpose of maintaining the rule 12 in its proper orientation. The purpose of providing a sliding rather than a fixed scale is to assist the operator in obtaining answers more quickly, with less effort, and with the least possibility of reading error. In addition, the slide makes it unnecessary to draw vertical lines on the calculator, and the face of the calculator is therefore less cluttered.

Although the invention has been described with reference to a particular embodiment; it will be understood to those skilled in the art that the invention is capable of a variety embodiments with the spirit and scope of the appended claims. For example, although the calculator is designed primarily to determine the effectiveness of backlobe jamming, the calculator is not limited in this respect. Main lobe-jamming burnthrough range would be obtained by using an index of zero db.

We claim:

1. A calculator for determining the backlobe-jamming burnthrough range of a radar comprising a flat surface having two vertical parallel sides, a one piece rule having two horizontal parallel sides, said rule being positioned on said surface having its parallel sides perpendicular to said parallel sides of said surface, said rule being capable of sliding motion in a direction parallel to said parallel sides of said surface, said surface having thereon a plurality of equally spaced parallel lines with a positive slope of four, said surface further having two vertical logarithmic scales thereon representing the effective jamming power density and the radar figure of merit, said rule having two horizontal scales thereon one being linear and representing the inverse jamming index and the other being logarithmic and representing the burnthrough range, said rule having extensions thereon operably connected to said flat surface for keeping said horizontal scales perpendicular to said vertical scales and yet allowing sliding motion in the direction parallel to said parallel sides of said surface, a conversion nomograph being mounted on the upper part of said flat surface for obtaining a predetermined range equivalent power density for jamming at ranges other than said predetermined range and a second conversion nomograph being mounted on the lower part of said flat surface for targets of other than a predetermined cross section, whereby by entering known values on three of said scales the fourth scale determines the range at which radar can detect a target when the radar is being jammed in the backlobes by multiple standoff jamming platforms.